2,983,615

FLAVOR STABILIZED SALTED MARGARINE AND PROCESS OF PRODUCING THE SAME

Daniel Melnick, Teaneck, N.J., assignor to Corn Products Company, a corporation of Delaware No Drawing. Filed Mar. 30, 1959, Ser. No. 802,632

11 Claims. (Cl. 99—123)

This invention relates to a margarine of exceptional flavor stability, and also, it pertains to a method of enhancing the shelf life of margarine.

This is a continuation-in-part of application Serial No. 731,115, filed April 28, 1958.

One of the problems confronting the margarine manufacturer is that of flavor stability, and the problem is particularly acute in case the margarine is stored at ambient temperature. Any improvement in this respect is of extreme importance to the manufacturers of margarine, consequently a great deal of effort is being expended towards production of flavor stable margarines. The present invention is concerned with an effective solution to such a problem.

Accordingly, an object of this invention is to provide a novel salted margarine of exceptional flavor stability.

Another object is to provide a method of improving the flavor stability of salted margarine.

Other objects and advantages of this invention will become apparent from the following description and explanation thereof.

The present invention is concerned with enhancing flavor stability of a salted margarine by the addition of an ethylenediaminetetraacetic acid component and a citric acid component. For the purpose of this invention, the ethylenediaminetetraacetic acid component is employed to designate generically the free acid and the edible mono-, di-, tri- or tetra-salts thereof. The ethylenediaminetetraacetic acid component is referred to hereinafter as the EDTA component and concentration is expressed in terms of the free EDTA. The citric acid component includes generically citric acid, the edible salts and the mono-alkyl esters thereof, and here also concentration is expressed in terms of the free citric acid.

The combination of the EDTA component and the citric acid component is necessary to obtain the unusual shelf life characteristic of the salted margarines of the present invention. The combination of these additives produces a synergistic effect as evident from the fact that the result is greater than is expected from the individual effects of the components. Generally, it is contemplated employing about 0.0002% to 0.05%, preferably about 0.001% to 0.03% of the EDTA component and about 0.02% to 0.15%, preferably about 0.03% to 0.1% of the citric acid component. Higher concentrations of these additives may be employed since they are harmless food additives but, when used in excess of the limits hereinabove presented, these higher concentrations serve no useful purpose in extending further the shelf life of the margarine.

The combination of additives is added to any margarine containing common salt or sodium chloride. Presently, according to government regulations, margarine is produced by combining a milk phase with not less than 80% by weight of fat. Usually skim milk in a quantity of about 15% to 20% by weight is employed; however, soy milk (a suspension of soy flour in water) may replace in whole or in part the skim milk. Sodium chloride is added to the margarines of the present invention in an amount of about 1% to 4% by weight; this is equal to about 5% to 20% in the aqueous phase of the margarine. The greater the quantity of salt in the margarine, the shorter the shelf life from the standpoint of flavor acceptance. Any quantity of salt has an adverse effect on the stability of margarine and this effect increases as the quantity of salt is increased, so that for the purpose of this invention I intend to cover any margarine containing salt as an ingredient. If in the future it is recommended employing larger quantities of salt than is customary at present, then it is intended that this invention apply to margarines containing more than 4% salt.

The fat employed in the manufacture of the margarine of the present invention may have a Wiley melting point of about 90° to 105° F., and more usually about 92° to 98° F. The setting point of the fat is about 70° to 82° F., and more usually about 72° to 78° F. The setting point is determined by the method described in U.S. 2,047,530. The iodine value (Wijs) of the fat may vary from about 70 to 105, and more usually about 75 to 90. The fat is derived wholly or in part from the hydrogenation of one or more vegetable oils. I also employ a blend of a hydrogenated vegetable oil and an unhydrogenated vegetable oil. The starting vegetable oil to be used in the manufacture of margarine may be, for example, cottonseed oil, soybean oil, corn oil, peanut oil, rice bran oil, safflower oil, milo oil, or the like. Such starting oils are liquid or limpid in the natural state and it is necessary that at least part of the margarine oil blend be hydrogenated to render the same suitable for use. It is also contemplated using blends of highly hydrogenated vegetable oil with a lightly hydrogenated vegetable oil.

The salt component of the margarine contains trace quantities of salts of metals such as iron and copper. By virtue of the methods of manufacture currently employed commercially, these trace metals may be present in an amount of about 0.2 to 20 p.p.m. and more frequently from 1 to 3 p.p.m. At present, salt manufacturers are selling to the food industry a premium grade salt containing less than 1 p.p.m. of iron. The copper content in the salt is also less than about 1 p.p.m. Here again, it should be understood that the quantity of trace metal impurities can be tolerated to the limits indicated because it is possible to counteract their effects by addition of the additives described hereinabove. While it is not known with certainty, I believe that iron and copper salts which are present as impurities in sodium chloride act as pro-oxidants and thereby have an adverse effect on the flavor of margarine. In the experimental work leading to the present discovery, it was found that salted margarines have a flavor life which is less than one-half of that obtained with margarine free of salt. In this connection a simple experiment was performed in which margarine fat was stored under air in a loosely-capped glass jar at 80° F. At the end of a two-week period the first indication of flavor deterioration became evident. The loss of flavor life of the margarine fat was not accelerated by the addition of 20% water. On the other hand, the addition of 2.8% sodium chloride of premium grade to the aqueous phase of the margarine caused flavor defects to appear during the third day of storage and at the end of one week the flavor of the margarine was unacceptable. On the basis of the results obtained in the experimental work to be discussed hereinbelow, it appears that the iron and copper salts are in some way combined with the additives of the present invention and thus rendered ineffective in spoilage of margarine flavor. I hold to this explanation even though peroxide development in foil-wrapped prints of margarine stored at 75° F. for a period of up to 10 weeks is small, viz., from 1 to only 5 me. per kg. of the margarine fat, and there is no significant increase in the concentration of carbonyl compounds in the separated margarine fat. I have had to rely upon objective flavor scorings rather than upon chemical methods in determining the value of my invention.

The edible citric acid component includes for the purpose of this invention citric acid as well as the monoalkyl esters and edible salts thereof. The alkyl esterifying group contains about 3 to 18 carbon atoms. Preferred members of this class of additive are mono-isopropyl citrate and mono-stearyl citrate. Commercially available isopropyl citrate is composed of about 65% to 80% of mono-isopropyl citrate, about 15% to 30% of di-isopropyl citrate, and about 5% to 10% of tri-isopropyl citrate. The stearyl citrate is composed of about 10% to 15% of mono-stearyl citrate, about 70% to 80% of di-stearyl citrate, and about 10% to 15% of tri-stearyl citrate.

In the preparation of the margarine the citric acid may be added to the oil or fat ingredient during the deodorization treatment. The deodorization treatment is conventional and involves subjecting the oil or fat ingredient of the margarine to steam at an elevated temperature of about 400° to 500° F. to remove undesirable volatile contaminants. The citric acid component is preferably added to the margarine oil or fat following deodorization. The citric acid component may be added, for example, in oil-dispersible form, using a mixture of mono- and di-fatty acid esters of glycerol as the vehicular material for the free acid or for the isopropyl citrate, or it is added directly to the deodorized oil in the form of the stearyl citrate. The citric acid component, so added to provide about 0.002% to 0.07% calculated as free citric acid in the margarine, affords protection to the oil under these conditions of treatment even before being combined with the salt in the final preparation of the margarine. Citric acid naturally provided by the milk component of the margarine is as the sodium, potassium and calcium salts and such milk provides about 0.02% to 0.08% as free citric acid in addition to that contributed by the oil phase.

The EDTA component includes free EDTA as well as the mono-, di-, tri- and tetra-salts thereof in which the salt forming radical is an edible metallic cation such as, for example, sodium, potassium, or calcium alone or combinations thereof. Specific examples of the EDTA salts are the disodium salt, the tripotassium salt, the disodium monocalcium salt, etc. as such or as their hydrates. In the preparation of the margarine it is preferred to add the EDTA component to the aqueous phase at approximately the same time as the salt addition. If desired, the EDTA component may be added after the margarine has been prepared and is still in a liquid phase. In any case, the EDTA component is added to the margarine under conditions promoting the distribution of the same throughout the aqueous phase of margarine product to provide a concentration of about 0.001% to 0.3% in the aqueous phase, equivalent to about 0.0002% to 0.05% in the overall margarine.

To provide a better understanding of the present invention, reference will be had to specific examples.

Margarine was prepared from (a) hydrogenated soybean oil having a melting point of 96° F., a setting point of 76° F. and an iodine value of 73, (b) skim milk and 2.8% sodium chloride, the latter containing 1.0 p.p.m. iron and 0.15 p.p.m. of copper, in the form of salts. The margarine samples were prepared in the form of ¼ pound prints, wrapped in aluminum foil, and four prints were packed in a wax carton. The samples were marked by code to hide their identities, and were scored for flavor by a panel of ten experts. The resulting margarine exhibited a flavor life at 75° F. of 2½ weeks before being scored below fair by the panel. This margarine contained 0.03% citric acid contributed by the skim milk. When the margarine oil was supplemented following deodorization with 0.015% of isopropyl citrate, predominantly mono-isopropyl citrate, the resulting margarine exhibited a flavor life at 75° F. of 4½ weeks. Total citric acid in this margarine, calculated to the free acid, was 0.042%. However, when the margarine was prepared similarly, except that the disodium salt of EDTA was added to the skim milk to provide an overall concentration of 0.01% by weight, expressed as free EDTA, it exhibited a flavor life in excess of 12 weeks at 75° F.

In the next series of experiments, various amounts of an EDTA component, citric acid, sodium citrate and sodium hexametaphosphate were added to margarine made with the same oil but with water in place of skim milk; the sam esalt at the same concentration of 2.8% was added. The margarines with appropriate control systems were stored at 80° F. under air in half-filled quart-size glass jars, loosely capped. The results obtained in evaluating the flavor stability of the margarines are summarized in Table I below.

*Table I*

EVALUATION OF METAL CHELATING AGENTS IN STABILIZING THE FLAVOR OF SALTED WATER MARGARINES

| Batch No. | Additive to Margarine | | Flavor of Margarine [1] at 80° F. after— | |
|---|---|---|---|---|
| | Identity | Concentration, percent | 1 Week | 3 Weeks |
| 1 | None | 0 | Fair to Poor | Poor. |
| 2 | Sodium hexametaphosphate | 0.01 | Poor | Very Poor. |
| 3 | Citric Acid | 0.0006 | Fair to Poor | Poor. |
| 4 | do | 0.0012 | Fair | Do. |
| 5 | do | 0.0024 | do | Do. |
| 6 | Citric Acid+Sodium citrate [2] | 0.003+0.007 | Fair to Poor | Do. |
| 7 | do [2] | 0.015+0.035 | do | Do. |
| 8 | do [2] | 0.030+0.070 | do | Do. |
| 9 | do [2] | 0.070+0.130 | do | Do. |
| 10 | EDTA, disodium salt [3] | 0.0003 | Fairly Good | Fair. |
| 11 | do [3] | 0.0005 | do | Do. |
| 12 | do [3] | 0.0010 | do | Fairly Good. |
| 13 | do [3] | 0.0020 | do | Do. |
| 14 | do [3] | 0.0040 | do | Do. |
| 15 | do [3] | 0.0080 | do | Do. |
| Oil alone | None | 0 | Good | Do. |
| Oil+salt-free water | do | 0 | do | Do. |

[1] Stored under air in a loosely capped glass jar at temperature indicated.
[2] Ratio of citric acid to citrate selected to keep pH at about 6; the citric acid was in anhydrous form, while the citrate was as the trisodium salt, dihydrate.
[3] Concentration expressed as free EDTA.

Here again it will be noted that the oil containing the mono-isopropyl citrate exhibited good flavor stability and that the addition of salt-free water in no way impaired the flavor stability. On the other hand, the water margarine containing 2.8% salt (batch 1) was very poor in flavor stability. Sodium hexametaphosphate, citric acid, and the combination of citric acid and sodium citrate in high concentrations failed to improve the flavor stability of the water margarines. On the other hand, the EDTA component in very small concentration (batch 10) imparted a measurable improvement to the flavor stability of the test margarine and in concentrations of from 0.001% to 0.008% (batches 12-15) the flavor stability was remarkably good, practically equal to that noted with the control test systems set up without any added salt.

Only when a margarine oil is used shortly after deodorization, i.e. within the first week, is it possible to rely upon the EDTA component in the margarine together with the citric acid contributed by the milk for stabilizing the flavor of the salted margarine. Margarine oils progressively deteriorate in flavor after deodorization and the objectionable flavors cannot be reversed or masked by the addition of the EDTA component to the margarine. Salted margarines made with the EDTA component, but without supplementation of the oil phase with a citric acid component during or shortly after deodorization, are the less preferred margarines of this invention.

To provide a better understanding of the present invention, reference will now be had to the following specific examples:

EXAMPLE I

To 80.4 parts by weight of a margarine fat having a melting point of 93.4° F., a setting point of 74.0° F. and an iodine value of 85.5 and having dispersed therein 0.01% of isopropyl citrate of which 70% was the mono-isopropyl citrate, the customary vitamins, emulsifiers and preservatives were added 16.8 parts by weight of EDTA-supplemented skim milk and 2.8 parts by weight of salt (sodium chloride) containing 1.6 p.p.m. of iron and 1.1 p.p.m. of copper. The fat consisted of 23 parts of soybean oil selectively hydrogenated to an iodine value of 67.4, 37 parts of soybean oil selectively hydrogenated to an iodine value of 92.8 and 40 parts of cottonseed oil selectively hydrogenated to an iodine value of 89.0. The fat was deodorized the day before the margarines were made, and it was just after deodorization when the isopropyl citrate in a mono- and diglyceride vehicle (38:62) was dispersed in the warm oil. The milk contributed an additional 0.04% of citric acid to the margarine. The EDTA component added to the margarine was the disodium salt and it was dissolved in the milk to bring the concentration of the additive, expressed as free EDTA, to 0.01% in the margarine; i.e., 0.06% by weight of the skim milk. The emulsion was converted into margarine using the conventional Votator assembly (Bailey, A.E., Industrial Oils and Fats, Interscience Publishers, Inc., New York, 2nd ed., pp. 921-3, 1951), involving a chilling A-unit and a quiescent B-unit. The extruded noodles were packed as ¼ pound prints in a conventional screw-drive packaging (Morpac) machine, the prints being foil wrapped and cartoned. The packaged margarines were then stored in both the refrigerator (45° F.) and at room temperature (75° F.) before being flavor-scored by the panel of experts. For control purposes, the same margarine was prepared but this time without the addition of the EDTA component to the milk phase. Whereas there was no significant difference in favor of the margarine containing the synergistic combination of additives when the margarine was stored at 45° F., there was a striking improvement in the flavor stability of the margarine containing the synergistic combination of the agents when the margarines were held at 75° F. The results are shown in Table II which follows hereinafter.

EXAMPLE II

To 80.4 parts by weight of a margarine fat having a melting point of 94.4° F., a setting point of 75.2° F. and an iodine value of 77.0 and having dispersed therein 0.01% of citric acid in oil-dispersible form, the customary vitamins, emulsifiers, and preservatives were added 16.8 parts by weight of EDTA-supplemented skim milk and 2.8 parts by weight of salt of premium quality. The fat consisted of 90 parts of regular margarine oil (50:50 soybean and cottonseed oil) selectively hydrogenated to an iodine value of 74.9 and 10 parts of limpid peanut oil of 93 iodine value. The citric acid, as an 8% solution in a mixture of mono- and di-fatty acid esters of glycerol, was added to the freshly deodorized oil at 140° F. as the oil was discharged from the deodorizer. The treated oil was then kept warm, at about 95° F., for a period of 4 weeks prior to use. The milk contributed an additional 0.04% of citric acid to the margarine. The EDTA component added to the margarine was the disodium monocalcium salt of EDTA and it was dissolved in the milk to bring the concentration of the additive, expressed as free EDTA, to 0.001% in the margarine, i.e., 0.006% by weight of the skim milk. This emulsion was converted into ¼ pound prints by passing the superchilled emulsion as a flowable or pumpable gel continuously through a molding zone with part of the titer heat due to fat crystallization being dissipated after the product had already set up in print form. The prints were foil wrapped and cartoned. The packaged margarines were then stored in both the refrigerator (45° F.) and at room temperature (75° F.) before being flavor-scored by the panel of experts. For control purposes, the same margarine was prepared but this time without the addition of the EDTA component to the milk phase. Whereas there was no significant difference in favor of the margarine containing the synergistic combination of additives when the margarine was stored at 45° F. there was a striking improvement in the flavor stability of the margarine containing the synergistic combination of the agents when the margarines were held at 75° F. (See Table II which follows.)

EXAMPLE III

To 80.4 parts by weight of a margarine fat having a melting point of 94.3° F., a setting point of 73.7° F. and an iodine value of 94.0 and having dissolved therein 0.005% of citric acid, the customary vitamins, emulsifiers and preservatives were added 17.6 parts by weight of EDTA-supplemented skim milk and 2.0 parts by weight of salt of premium quality. The fat consisted of 40 parts of liquid unhydrogenated corn oil, 39.5 parts of soybean oil selectively hydrogenated to an iodine value of 69.6 and 20.5 parts of cottonseed oil selectively hydrogenated to an iodine value of 89.0. The citric acid was added as a 10% aqueous concentrate to the hot margarine oil as it underwent deodorization. The margarine fat was employed in producing the margarine of this example the day after it was deodorized. The milk contributed an additional 0.04% of citric acid to the margarine. The EDTA component added to the margarine was the free acid and it was dissolved in the milk to bring the concentration of the additive to 0.0005% in the margarine; i.e., 0.003% by weight of the skim milk. This emulsion was converted into margarine using the conventional Votator assembly (Bailey, A.E., Industrial Oils and Fats, Interscience Publishers, Inc., New York, 2nd ed., pp. 921-3, 1951), involving a chilling A-unit and a quiescent B-unit. The extruded noodles were packed as ¼ pound prints in a conventional screw-drive packaging (Morpac) machine, the prints being foil wrapped and cartoned. The packaged margarines were then stored in both the refrigerator (45° F.) and at room temperature (75° F.) before being flavor-scored by the panel of experts. For control purposes, the same margarine was prepared but this time without the addition of the EDTA component to the milk phase. Whereas there was no significant difference in favor of the margarine containing the synergistic combination of additives when the margarine was stored at 45° F., there was a definite improvement in the flavor stability of the margarine containing the synergistic combination of the agents when the margarines were held at 75° F. The results are reported in Table II hereinafter.

EXAMPLE IV

A margarine duplicating that described in Example I was prepared but without a citric acid component in the margarine oil. The milk phase of this margarine was identical to that of Example I. The control margarine in the present example lacked both a citric acid component in the oil and also an EDTA component in the milk phase. The fat was deodorized the day before the margarines were made and the margarine products were made and packaged according to the same process described in Example I. Here also, there was no significant difference in favor of the margarine containing the EDTA component in combination with the citric acid contributed by the milk when the margarine was stored at 45° F. but there was a striking improvement in the flavor stability of the margarine containing a synergistic combination of EDTA component and citric acid when the margarines were held at 75° F. Two additional margarines were prepared duplicating the margarines of this example but differing from them in that the margarine oil blends were first stored for a period of 4 weeks at 95° F. prior to the production of the margarines. These latter two margarines exhibited poor shelf life. These margarines were scored as fair when first prepared and very shortly thereafter were scored as unacceptable when held at 75° F.

the control margarines and the novel products of this invention.

The "$p$" value in comparing the flavor scores of a novel margarine versus its control (both stored at 75° F.) indicates how much reliance can be placed upon the difference noted. Thus, when $p$ is found to be equal to 0.001, it means that there are 999 chances out of a 1000 that the difference noted is not due to chance alone; $p=0.05$, means that there are 95 chances out of 100 that the difference noted between the two margarines is not due to chance alone. The data in Table II point to the synergistic activity exhibited between the citric acid component and the EDTA component when used according to the processes herein described in extending the shelf life of salted margarine stored at room temperature. It is to be also noted, from the data in Table II, that only when the margarine oil blend is used shortly after deodorization is it possible to rely solely upon the combination of the EDTA and citric acid components in the aqueous phase of the margarine for extending the flavor life of the product at room temperature, but such a margarine is less preferred to those containing the synergistic combination of the EDTA component dissolved in the aqueous phase and at least part of the citric acid component in the oil shortly after deodorization.

Having thus provided a written description of the present invention and provided specific examples thereof, it should be understood that no undue restrictions or limitations are to be imposed by reason thereof but that the present invention is defined by the appended claims.

I claim:

1. A composition comprising an edible citric acid com-

Table II

FLAVOR SCORE OF NOVEL MARGARINES [1] HELD AT ROOM TEMPERATURE (75° F.) VERSUS CONTROL MARGARINES

| Margarine | Citric Acid Component [2] in Oil | | EDTA Component in Milk | | Flavor Score [4] After— | | | | Significance in Favor of Novel Margarine | Shelf Life of Margarine, Weeks |
|---|---|---|---|---|---|---|---|---|---|---|
| | Identity | Concentration, percent | Identity | Concentration [3] in Margarine, percent | 3 Wks. | 6 Wks. | 9 Wks. | 12 Wks. | | |
| Control | Isopropyl citrate | 0.01 | None | 0.0 | 3.33 | 2.63 | 2.19 | 2.12 | | 4 |
| Example I | ___do___ | 0.01 | EDTA, disodium | 0.01 | 3.78 | 3.63 | 3.38 | 3.31 | $p=0.001$ | 12+ |
| Control | Citric Acid | 0.01 | None | 0.0 | 3.31 | 2.75 | 2.31 | 1.94 | | 4½ |
| Example II | ___do___ | 0.01 | EDTA, disodium, monocalcium. | 0.001 | 3.88 | 3.50 | 3.25 | 2.69 | $p=0.001$ | 10 |
| Control | ___do___ | 0.005 | None | 0.0 | 3.31 | 2.83 | 2.00 | 1.69 | | 4½ |
| Example III | ___do___ | 0.005 | EDTA, free | 0.0005 | 3.44 | 3.44 | 2.75 | 2.00 | $p=0.05$ | 7½ |
| Control | None | 0.0 | None | 0.0 | 2.79 | 2.38 | 1.82 | 1.25 | | 2½ |
| Example IV | ___do___ | 0.0 | EDTA, disodium | 0.01 | 3.94 | 3.01 | 2.81 | 2.62 | $p=0.001$ | 6 |
| Control (b) [5] | ___do___ | 0.0 | None | 0.0 | 2.25 | 2.12 | 1.71 | 1.04 | | ½ |
| Control (c) [5] | ___do___ | 0.0 | EDTA, disodium | 0.01 | 2.71 | 2.43 | 1.92 | 1.32 | | 2½ |

[1] The novel margarines and their respective controls scored fairly good to good prior to storage.
[2] In addition, the milk in the margarine contributed 0.04% of citric acid to each of the margarines.
[3] Expressed as free EDTA.
[4] Average score obtained from a panel of 10 expert flavor scorers: 5=good; 4=fairly good; 3=fair; 2=poor; 1=very poor.
[5] These control margarines were scored as fair (3.00) prior to storage, since the margarine oil blends were stored 4 weeks at 95° F. prior to use.

In Table II above is a summary of the flavor scores obtained in testing the novel margarines of this invention. As mentioned earlier in this specification, it was impossible to rely upon chemical methods for measuring oxidative deterioration in the margarines in order to obtain a quantitative index of the flavor improvement in the margarine following its supplementation with the EDTA and citric acid components in synergistic combination. Hence, it was necessary to rely upon the results obtained in the flavor scoring of the margarines with a test panel of expert margarine scorers using objective flavor scoring techniques involving the scoring of the margarines under code markings and statistical analysis of the results obtained.

The data obtained in scoring the margarines held in the refrigerator (45° F.) are not presented, since there were no significant differences in the flavor stability between ponent and an edible ethylenediaminetetraacetic acid component in combination with salted margarine.

2. A composition comprising about 0.02% to 0.15% of an edible citric acid component, about 0.0002% to 0.05% of an edible ethylenediaminetetraacetic acid component and the remainder comprising salted margarine.

3. A margarine comprising sodium chloride, an aqueous phase and a vegetable fat ingredient, the vegetable fat having a melting point of about 90° to 105° F., a setting point of about 70° to 82° F. and an iodine number of about 70 to 105, said margarine also containing about 0.02% to 0.15% of an edible citric acid component and about 0.0002% to 0.05% of an edible ethylenediaminetetraacetic acid component.

4. A margarine comprising sodium chloride, a milk phase and a deodorized vegetable fat having a melting point of about 90° to 105° F., a setting point of about 70° to 82° F. and an iodine number of about 70 to 105, and about 0.0002% to 0.05% of an edible ethylenediaminetetraacetic acid component and about 0.02% to 0.08% of an edible citric acid component, the latter contributed by the milk.

5. A process of stabilizing the flavor of salted margarine which comprises adding to the same the combination of an edible citric acid component and an edible ethylenediaminetetraacetic acid component.

6. The process of stabilizing the flavor of salted margarine which comprises adding about 0.002% to 0.07% of an edible citric acid component to a margarine fat, adding about 0.001% to 0.3% of an edible ethylenediaminetetraacetic acid component to an aqueous phase, and combining the margarine fat and the aqueous phase to produce the margarine product.

7. The process of claim 6 wherein the aqueous phase is a milk containing about 5% to 20% of sodium chloride contaminated with an impurity selected from the group consisting of iron and copper salts, and said milk providing about 0.02% to 0.08% of additional edible citric acid component to the margarine.

8. A margarine comprising sodium chloride, an aqueous milk phase and a vegetable fat ingredient, the vegetable fat having a melting point of about 90° to 105° F., a setting point of about 70° to 82° F., and an iodine number of about 70 to 105, said margarine containing about 0.002% to 0.07% of an edible citric acid component, added to the oil phase, and about 0.0002% to about 0.05% of an edible ethylenediaminetetraacetic acid component, added to the milk phase.

9. The combination of isopropyl citrate and an edible ethylenediaminetetraacetic acid component in combination with salted milk-containing margarine.

10. The process of stabilizing the flavor of a salted milk containing margarine which comprises adding about 0.002% to about 0.07% of an edible citric acid component to a margarine fat, and adding about 0.0002% to about 0.05% of an edible ethylenediaminetetraacetic acid component to the milk phase, and combining the margarine fat and the milk phase to produce the margarine product, said concentrations of the added acid components being expressed in terms of the free acids in the final margarine product.

11. A margarine comprising sodium chloride, an aqueous milk phase and a vegetable fat ingredient, the vegetable fat having a melting point of about 90° to 105° F., a setting point of about 70° to 82° F., and an iodine number of about 70 to about 105, said margarine containing about 0.03 to 0.09% of an edible citric acid component and about 0.0005 to about 0.01% of an edible ethylenediaminetetraacetic acid component.

References Cited in the file of this patent

UNITED STATES PATENTS

| Number | Name | Date |
|---|---|---|
| 2,047,530 | Vahlteich et al. | July 14, 1936 |
| 2,485,634 | Vahlteich et al. | Oct. 25, 1949 |
| 2,813,032 | Hall | Nov. 12, 1957 |
| 2,885,292 | Stapf | May 5, 1959 |

OTHER REFERENCES

Rose: "The Condensed Chemical Dictionary," fifth ed., 1956, Reinhold Publishing Corp., pp. 456 and 998.